(12) United States Patent
Nakamura et al.

(10) Patent No.: US 7,463,282 B2
(45) Date of Patent: Dec. 9, 2008

(54) SOLID-STATE IMAGE PICKUP DEVICE AND CLAMP CONTROL METHOD THEREFOR

(75) Inventors: Nobuo Nakamura, Kanagawa (JP); Yoko Okuzaki, Kanagawa (JP); Ken Koseki, Kanagawa (JP); Yasushi Nakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 944 days.

(21) Appl. No.: 10/292,085

(22) Filed: Nov. 12, 2002

(65) Prior Publication Data
US 2003/0117676 A1 Jun. 26, 2003

(30) Foreign Application Priority Data
Nov. 26, 2001 (JP) ............................. 2001-358892

(51) Int. Cl.
*H04N 5/225* (2006.01)

(52) U.S. Cl. ................. 348/207.1; 348/222.1; 348/241; 348/294; 348/255; 348/257

(58) Field of Classification Search ................. 348/255, 348/257, 222.1, 241, 294
See application file for complete search history.

(56) References Cited

U.S. PATENT DOCUMENTS

| | | | | |
|---|---|---|---|---|
| 5,596,427 A | * | 1/1997 | Honma et al. | 358/515 |
| 6,499,663 B1 | * | 12/2002 | Yahagi et al. | 235/462.28 |
| 6,570,617 B2 | * | 5/2003 | Fossum et al. | 348/308 |
| 6,587,143 B1 | * | 7/2003 | Boisvert | 348/241 |
| 6,587,144 B1 | * | 7/2003 | Kim | 348/241 |
| 6,597,395 B1 | * | 7/2003 | Kim et al. | 348/222.1 |
| 6,791,607 B1 | * | 9/2004 | Bilhan et al. | 348/243 |

* cited by examiner

*Primary Examiner*—David Ometz
*Assistant Examiner*—Usman Khan
(74) *Attorney, Agent, or Firm*—Robert J. Depke; Rockey, Depke & Lyons, LLC.

(57) ABSTRACT

In an analog front end (FE) IC chip having a CDS (Correlated Double Sampling) function and an AGC (Automatic Gain Control) function, a clamp circuit for clamping an output signal during a black reference signal period is equipped with a mechanism for suppressing the effect of noises contaminated from a power source, external circuits, etc.

16 Claims, 17 Drawing Sheets

SOLID-STATE IMAGE PICKUP DEVICE AND CLAMP CONTROL METHOD THEREFOR

This application claims priority to Japanese Patent Application Number JP2001-358892 filed Nov. 26, 2001, which is incorporated herein by reference.

BACKGROUND OF THE INVENTION

1. Field of the Invention

The present invention relates to a solid-state image pickup device for feeding back video signals picked up by an image sensor and applying the feedback video signals thus achieved as a control signal, and a clamp control method for the solid-state image pickup device.

2. Description of the Related Art

FIG. 15 is a block diagram showing an example of an analog front end processor (hereinafter referred to as "analog FE") equipped to a conventional solid-state image pickup device.

An analog FE1 has a CDS (Correlated Double Sampling) circuit 3 for performing correlated double sampling processing on an input signal Vin input from an input terminal 2 by using plural sample hold (SH) circuits, an AGC (Automatic Gain Control) circuit 4 for controlling the gain of the CDS circuit 3, a low pass filter (LPF) circuit 5 for low-passing the output of the AGC circuit 4, a drive (DRV) amplifier 6 for amplifying the output of the LPF circuit 5 and outputting the amplified output from an output terminal 7, a clamp circuit 18 for clamping the output signal DRVout of the DRV amplifier 6 to a predetermined reference value. The output signal DRVout is clamped during a black reference signal period of an image pickup device by the clamp circuit 18.

The clamp circuit 18 has a feedback loop 18A for feeding back the output signal DRVout of the DRV amplifier 6, a switch 18B for opening/closing the feedback loop 18A on the basis of a clamp control signal CLPOB input from the external, and an OP amplifier 12 for comparing the voltage value of the output signal DRVout with a reference voltage value Vref based on a predetermined reference voltage source 11 and outputting the differential signal thereof. The AGC circuit 4 is controlled on the basis of the differential signal ΔVout from the OP amplifier 12 to clamp the output signal so that the voltage value of the output signal DRVout and the reference voltage value Vref are equal to each other.

A node 18C connected to an external feedback-loop capacitor 15 through an external connection terminal 14 of the analog FE1 is equipped between the switch 18B of the feedback loop 18A and the AGC circuit 4. Further, the OP amplifier 12 and the reference voltage source 11 are connected to a reference power source capacitance 9 through an external connection terminal 8 of the analog FE1. Further, the clamp control signal CLPOB is input from the external connection terminal 19.

IC constituting such an analog FE1 is usually used as a signal processing IC for the output signal of a solid-state image pickup device such as a CCD image sensor, or a CMOS image sensor.

The conventional CCD image sensor or the CMOS image sensor generally has a black reference signal at at least one of a vertical blanking period and a horizontal blanking period, and sets the clamp control signal CLPOB input from the external to "ON" during a black reference signal output period at a frame period or a horizontal period and actuates the switch 18B of the feedback loop 18A so that the voltage value of the output signal DRVout and the reference voltage value Vref are equal to the same voltage. Accordingly, even when the black reference signal voltage of the input signal is varied, the output signal DRVout can be output on the basis of the constant reference voltage value Vref fixed at all times.

FIG. 16 is a block diagram showing an analog FE2 equipped to another conventional solid-state image pickup device. In FIG. 16, the common elements with FIG. 15 are represented by the same reference numerals.

The analog FE2 of FIG. 16 is designed so that the reference voltage source 11 of the clamp circuit 18 shown in FIG. 15 described above is equipped at the outside of IC (not shown), and the reference voltage value Vref is input from an external connection terminal 17.

The feedback loop 18A, the switch 18B, the OP amplifier 12, etc. of the clamp circuit 18 are equipped in IC. In place of the output of the DRV amplifier 6, the output of the LPF circuit 5 is used as a signal to be fed back as shown in FIG. 16.

This type of analog FE is used for a one-chip circuit containing not only the CDS function and the AGC function, but also an A/D (Analog-Digital Converter) function and a TG (Timing Generator) function of driving an image sensor. Further, a solid-state image pickup device such as CDD, or a CMOS image sensor which contains these functions therein is broadly used.

However, the conventional circuit construction described above has had a disadvantage that it is difficult to prevent the effect of noises contaminated from the power source voltage or GND.

FIG. 17 is a diagram showing an example of a noise voltage contaminated to the power source as described above, and the ordinate represents the noise voltage while the abscissa represents the frequency.

The output signal DRVout from the IC chip described above is delivered to a signal processing board (or signal processing IC) at the next stage, however, the problem of noise contamination from the signal processing board (or signal processing IC) exists.

As shown in FIG. 17, as noises contaminated into an image exist the 30 Hz noise corresponding to a frame frequency contaminated from the signal processing board (or signal processing IC) at the next stage, higher harmonic wave frequency noises of the 30 Hz noise, a 50 Hz noise contaminated from the power source and the higher harmonic wave frequency noises of the 50 Hz noise. Accordingly, it is required to suppress the noises contaminated from the power source and the noises contaminated from the signal processing board (or signal processing IC) at the next stage as described above.

Further, in order to prevent fluctuation of the external terminal voltage out of the feedback period, it has been needed to lead out at least one node 18C of the feedback loop 18A as an external terminal connection 14 and connect an element having a large capacitance value to the capacitor 15 described above (see FIG. 15).

This capacitance value is equal to a large value (about 0.1 μF to 10 μF), and thus a large part volume is needed. Therefore, it is difficult to miniaturize a camera system using such an IC chip as described above.

SUMMARY OF THE INVENTION

In view of the foregoing situation, the present invention has an object to provide a solid-state image pickup device which can suppress the effect of noises contaminated from a power source, an external circuit, etc. into a clamp circuit for clamping an output signal during a black reference signal period in an analog front end IC chip having a CDS function, an AGC function, etc., and simplify the construction of the IC chip, and a clamp control method for the solid-state image pickup device.

In order to attain the above object, according to the present invention, there is provided a solid-state image pickup device including an image sensor having a black reference signal during at least one of a vertical blanking period and a horizontal blanking period, a correlated double sampling circuit for removing noises from the output signal from the image sensor, a gain control amplifier for amplifying the output signal of the correlated double sampling circuit, and a clamp circuit for making the output value of the gain control amplifier corresponding to the period of the blank reference signal coincident with a predetermined reference value, wherein the clamp circuit has a feedback loop for performing feedback control on the gain control amplifier on the basis of the output signal, operating means for comparing the output signal output to the feedback loop with the reference value and outputting a clamp signal, a switch for opening/closing the feedback loop in accordance with the period of the black reference signal, and gain control means for controlling the gain of the clamp signal supplied to the gain control amplifier.

Further, according to the present invention, there is provided a solid-state image pickup device including an image sensor having a black reference signal during at least one of a vertical blanking period and a horizontal blanking period, a correlated double sampling circuit for removing noises from the output signal from the image sensor, a gain control amplifier for amplifying the output signal of the correlated double sampling circuit, and a clamp circuit for making the output value of the gain control amplifier corresponding to the period of the blank reference signal coincident with a predetermined reference value, wherein the clamp circuit has a feedback loop for performing feedback control on the gain control amplifier on the basis of the output signal, operating means for comparing the output signal output to the feedback loop with the reference value and outputting a clamp signal, a switch for opening/closing the feedback loop in accordance with the period of the black reference signal, and has at least one node connected to a first capacitance element to suppress voltage variation out of a feedback clamp period so that the node concerned is prevented from being kept under a floating state out of the clamp period.

Still further, according to the present invention, there is provided a clamp control method for a solid-state image pickup device including an image sensor having a black reference signal during at least one of a vertical blanking period and a horizontal blanking period, a correlated double sampling circuit for removing noises from the output signal from the image sensor, a gain control amplifier for amplifying the output signal of the correlated double sampling circuit, and a clamp circuit for making the output value of the gain control amplifier corresponding to the period of the blank reference signal coincident with a predetermined reference value, the clamp circuit having a feedback loop for performing feedback control on the gain control amplifier on the basis of the output signal, operating means for comparing the output signal output to the feedback loop with the reference value and outputting a clamp signal, a switch for opening/closing the feedback loop in accordance with the period of the black reference signal, and gain control means for controlling the gain of the clamp signal supplied to the gain control amplifier, wherein the gain of the clamp signal supplied to the gain control amplifier is controlled by another gain control means different from the operating means.

According to the solid-state image pickup device and the clamp control method of the present invention, the clamp circuit for making the output value of the gain control amplifier corresponding to the period of the black reference signal with the predetermined reference value is equipped with the gain control means for controlling the gain of the clamp signal supplied to the gain control amplifier. Therefore, even when various kinds of noises are contaminated from a power source, an external circuit or the like into the clamp circuit, the noises can be suppressed by the gain control means and the effect of the noises on the gain control amplifier can be reduced, thereby suppressing the effect of noises on image pickup signals.

Further, according to the solid-state image pickup device of the present invention, the node connected to the first capacitance element for suppressing the voltage variation out of the feedback clamp period is prevented from being kept under the floating state out of the clamp period, whereby the state of the clamp circuit can be stabilized during the period other than the clamp period, and the effect of hum noises, etc. can be suppressed.

DETAILED DESCRIPTION OF THE PREFERRED EMBODIMENTS

Preferred embodiments according to the present invention will be described hereunder with reference to the accompanying drawings.

Figure 1:
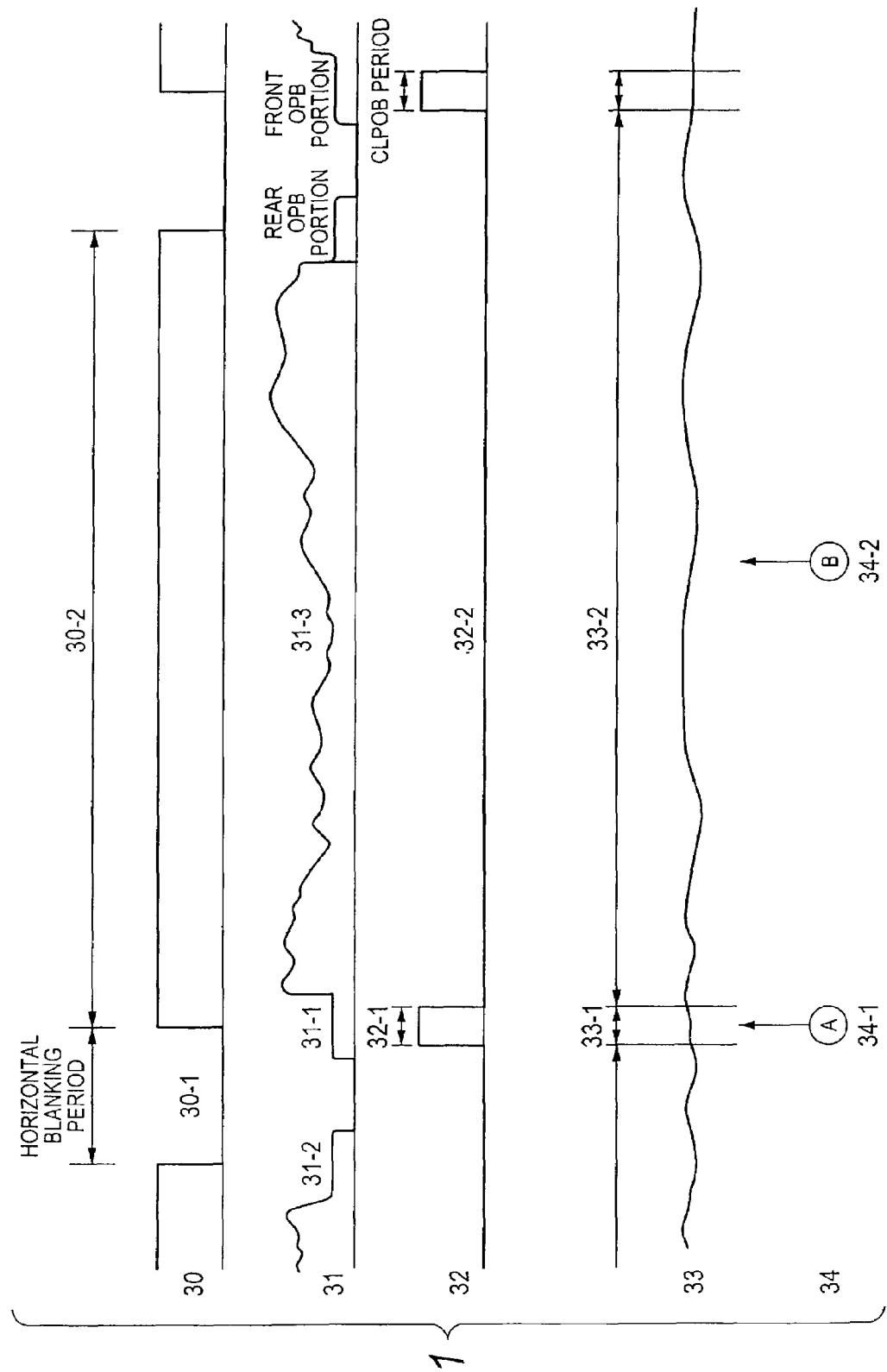
FIG. 1 is a timing chart showing the states of respective signals to explain the operation principle of the present invention.

FIG. 1 is a timing chart showing the states of respective signals to explain the operation principle of the present invention.

In a solid-state image pickup device according to this embodiment, the timing chart of FIG. 1 shows a horizontal timing period (H timing) 30, an output signal (DRVout) 31 of the analog FE, a clamp control signal (CLPOB) 32 for making the analog FE execute the clamp operation, AGCCLP signal 33 corresponding to a voltage state at the clamp time of an AGC circuit of the analog FE and the timings 34-1 and 34-2 of two noise countermeasures A and B.

The DRVout signal 31 includes signals which are output during a black reference period (front OPB portion) 31-1 located before 1 H period, during a black reference period (rear OPB portion) 31-2 located subsequently to 1 H period and during an effective period 31-3 between the above black reference periods.

In this case, the clamp operation is carried out on a part of the area of the signal 31-1 of the front black reference period by the first CLPOB signal 32-1. That is, the feedback loop circuit of the analog FE is operated during only the CLPOB period 32-1 to make the output of the DRVout 31, that is, the voltage of the black reference period based on a part of the front OPB portion 31-1 coincident with a reference signal voltage Vref described later.

Even when the voltage level of the front OPB period 31-1 of the DRVout voltage 31 is varied due to temperature variation in the same IC, it can be forcedly set to the fixed Vref voltage through the feedback operation as described above.

That is, the reference signal voltage 31-1 of the output voltage DRVout is set to the voltage output value Vref having the fixed value at all the times irrespective of the temperature variation. As described above, the effect of the temperature variation can be suppressed by making the output voltage DRVout 31-1 carry out the feedback operation during the first CLPOB period 32-1.

In this embodiment, as a noise countermeasure, a current voltage converting circuit for adjusting the gain of the feedback loop during the feedback clamp period 33-1 to a predetermined magnitude is provided to thereby suppress noises occurring at the power source or GND at the feedback time (noise countermeasure 34-1A).

Further, the construction that an external capacitor (first capacitance element) having large capacitance is connected from the outside of IC is equipped with a route through which no external noise is contaminated from the external connection terminal connected to the external capacitor during the period 33-2 other than the feedback clamp period (noise countermeasure 34-1B).

Specific embodiments to implement the features of the present invention as described above will be successively described. In the following embodiments, the common constituent parts to the prior art are represented by the same reference numerals.

Figure 2:
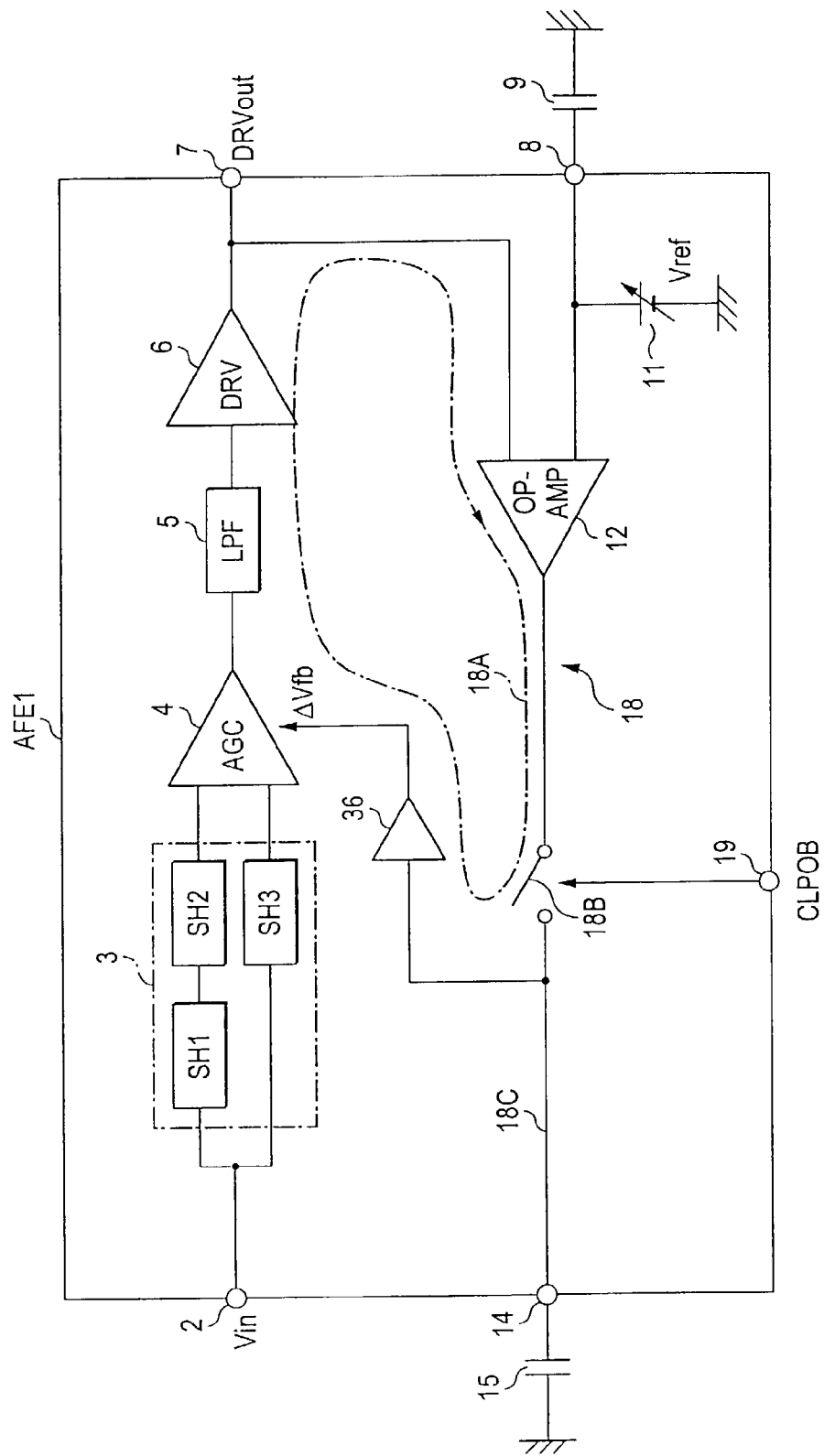
FIG. 2 is a block diagram showing the construction of an analog FE of a solid-state image pickup device according to a first embodiment of the present invention.

FIG. 2 is a block diagram showing the construction of an analog FE of a solid-state image pickup device according to a first embodiment of the present invention.

Figure 15:
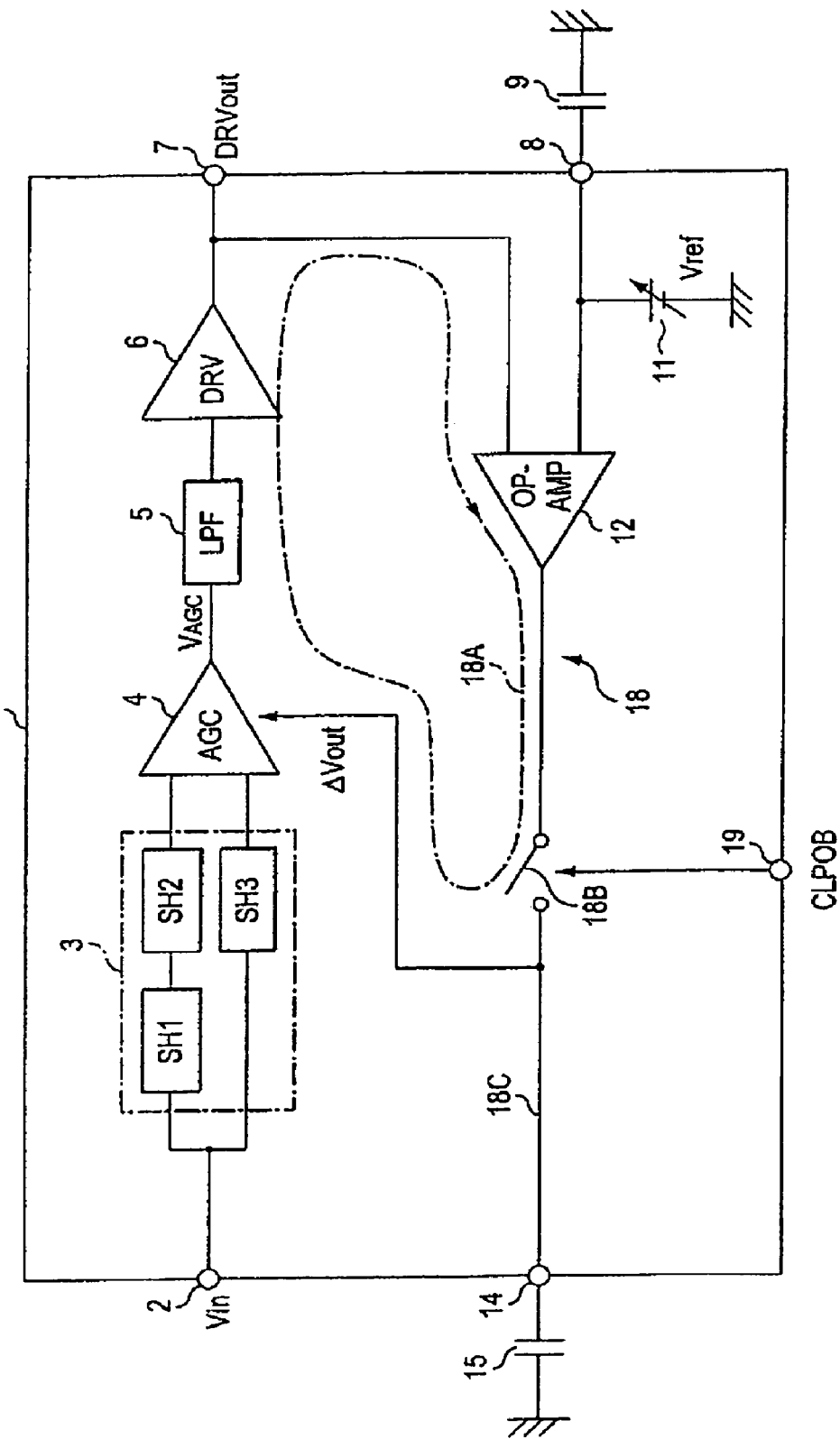
FIG. 15 is a block diagram showing a first construction of an analog FE equipped to a conventional solid-state image pickup device.

The analog FE1 is designed so that a voltage-current converting circuit (attenuating amplifier) 36 is added to the construction of the conventional analog FE shown in FIG. 15, and a CDS circuit 3, an AGC circuit 4, an LPF circuit 5, a DRV amplifier 6, etc. are the same as shown in FIG. 15. Further, capacitors 9, 15, etc. connected to the analog FE1 from the outside are the same as shown in FIG. 15. In this case, the external capacitor 9 corresponds to the first capacitance element described above.

As in the case of FIG. 15, the clamp circuit 18 is equipped with a feedback loop 18A, a switch 18B, a reference voltage source 11 and an OP amplifier (operating means) 12, and a voltage-current converting circuit 36 is equipped as gain control means between the switch 18B of the feedback loop 18A and the AGC circuit 4.

In the clamp circuit 18, by conducting the voltage-current conversion on the voltage variation value $\Delta$Vout of the differential signal output by the OP amplifier 12, a voltage value $\Delta$Vfb ($\Delta$Vfb<$\Delta$Vout) smaller than the voltage variation value $\Delta$Vout is output as a gain control signal to the AGC circuit 4.

Here, since the OP amplifier 12 supplies the input signal difference (DRVout–Vref) as a large voltage output $\Delta$Vout to the AGC circuit 4, it is effective to make the output voltage DRVout of the analog FE1 coincident with the reference voltage Vref.

However, for example, noises contaminated from the power source of the OP amplifier 12 or GND are also amplified with a large amplification factor of the OP amplifier 12, so that the noises are also amplified. Therefore, in order to suppress the effect of the noises, a circuit for controlling the feedback loop gain is indispensably equipped in the feedback loop 18A.

Accordingly, according to this embodiment, the voltage-current converting circuit 36 for converting the voltage to the corresponding current is inserted, and the feedback loop gain is controlled by this circuit.

Here, the output of the voltage-current converting circuit 36 is achieved as a current variation amount $\Delta$ifb, and it is shown as the voltage variation amount $\Delta$Vfb corresponding to the current variation amount in FIG. 2.

In this embodiment, the voltage-current converting circuit 36 is used as the gain control means of the feedback loop gain. However, a current-voltage converting circuit, a current-current converting circuit or a voltage-voltage converting circuit may be also used as the gain control means. That is, any means may be used insofar as it can suppress the feedback loop gain. In short, this embodiment is characterized in that any means which can control the feedback loop gain is inserted in the feedback loop in addition to the OP amplifier 12 for comparing the output signal with the reference signal.

Figure 3:
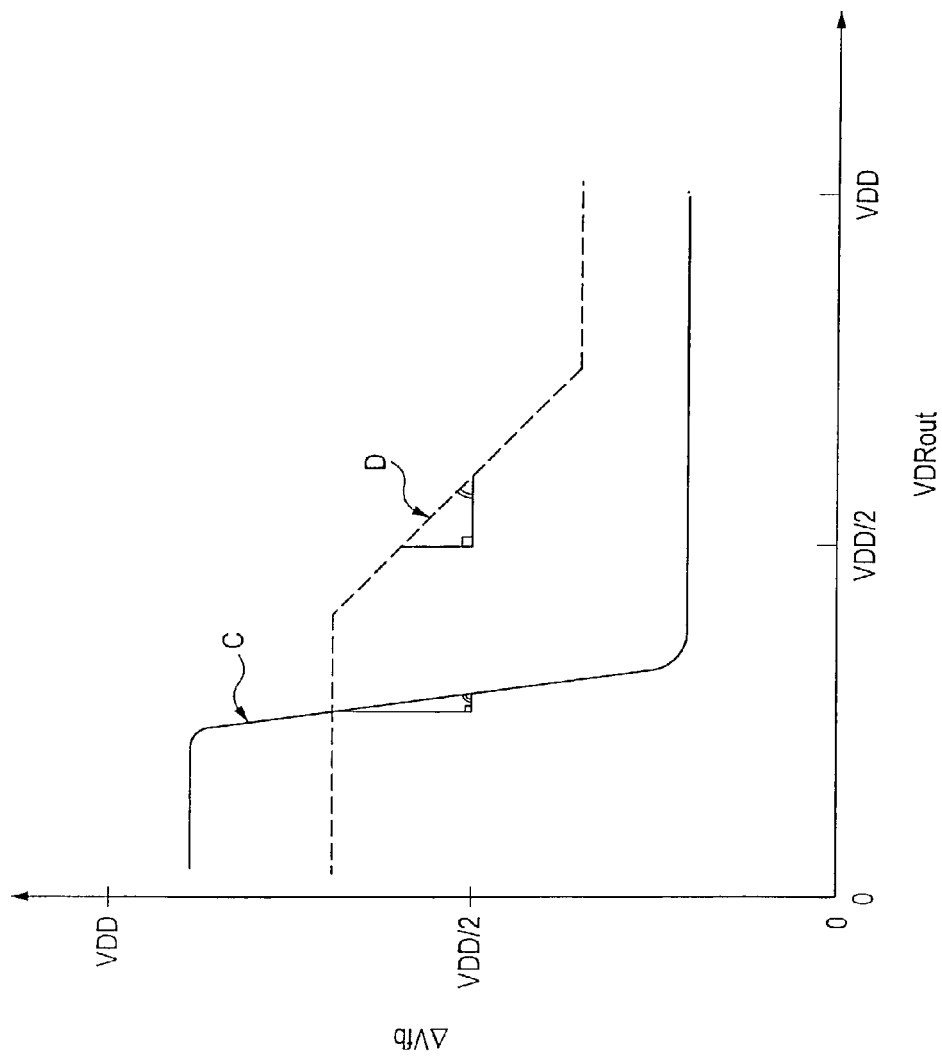
FIG. 3 is a diagram showing a specific example of the control operation of gain control means in the construction of the first embodiment shown in FIG. 2.

FIG. 3 is a diagram showing a specific example of the control operation of the gain control means in the construction of the first embodiment shown in FIG. 2, and it shows the variation (ordinate axis) of the control voltage $\Delta$Vfb of the voltage-current converting circuit 36 with respect to the variation (abscissa axis) of the output signal DRVout corresponding to the input of the OP amplifier 12.

As indicate by a solid line C of FIG. 3, when the gain of the feedback loop is large, the voltage variation $\Delta$Vout which is fed back with respect to small variation of the output voltage DRVout is increased, and the analog FE1 is weak to the noise variation of the power source and GND for the OP amplifier 12, etc.

Therefore, the feedback loop gain is reduced to a predetermined magnitude or less by inserting the voltage-current converting circuit 36 as indicated by a broken line D of FIG. 3, thereby improving the characteristic with respect to the noise variation.

That is, by keeping the following inequality: $\Delta Vfb<\Delta Vout$, the effect of noises contaminated from the power source and GND for the OP amplifier 12 and the voltage-current converting circuit 36 can be suppressed. This corresponds to the noise countermeasure A during the feedback loop operating period (the CLPOB period 32-1 of FIG. 1).

Figure 4:
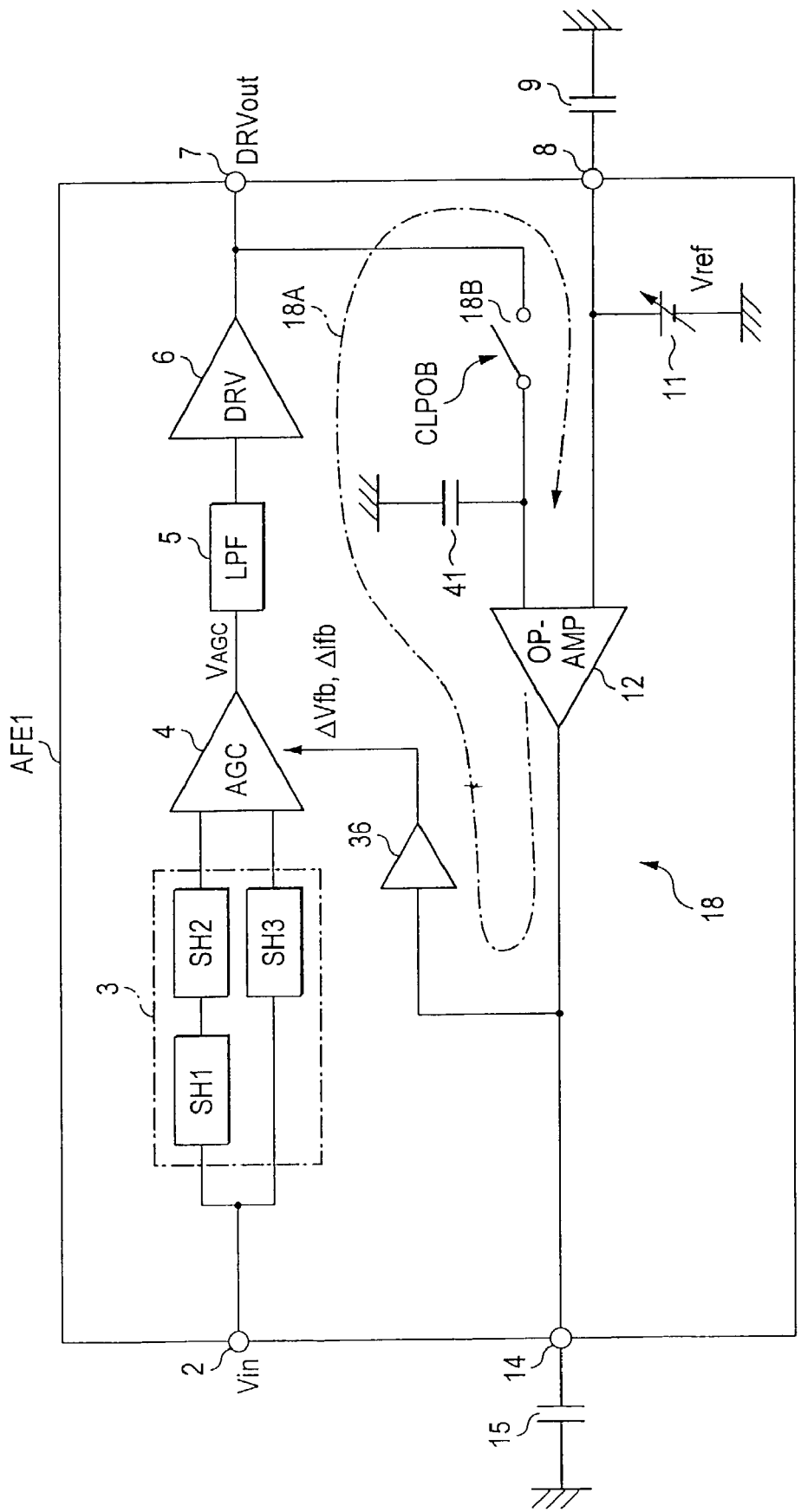
FIG. 4 is a block diagram showing the construction of an analog FE of a solid-state image pickup device according to a second embodiment of the present invention.

FIG. 4 is a block diagram showing the construction of an analog FE of a solid-state image pickup device according to a second embodiment of the present invention.

The analog FE of this embodiment has the same basic construction as shown in FIG. 2. However, this embodiment is different from the embodiment of FIG. 2 in that a capacitor (second capacitance element) 41 for holding the voltage of the feedback loop 18A is equipped on the feedback loop 18A input to the OP amplifier 12, and a switch 18B is equipped at the upstream side of the capacitor 41 (at the output terminal (7) side). That is, in this embodiment, even when the switch 18B is set to "OFF" state, the capacitor 15 connected to the external connection terminal 14 is prevented from being kept under the floating state, so that the effect of various kinds of noises contaminated from the capacitor 15 connected to the external connection terminal (hum noises, external diving noises, power source/GND noises) can be suppressed. This corresponds to the noise countermeasure B (34-2) of FIG. 1.

The other parts are the same as the embodiment shown in FIG. 2, and the description thereof is omitted.

Figure 5:
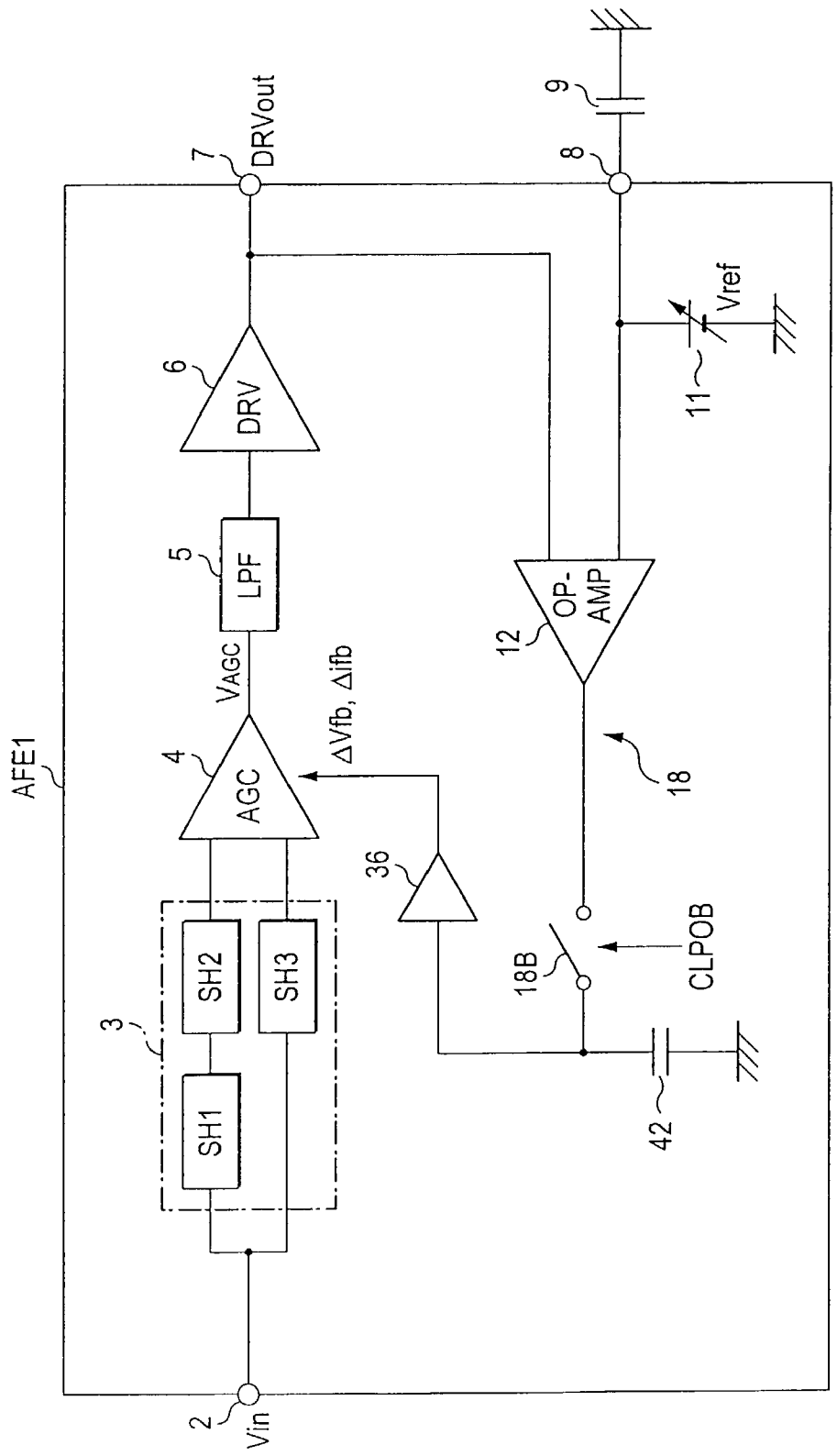
FIG. 5 is a block diagram showing the construction of an analog FE of a solid-state image pickup device according to a third embodiment of the present invention.

FIG. 5 is a block diagram showing the construction of an analog FE of a solid-state image pickup device according to a third embodiment of the present invention.

In this embodiment, a capacitor 42 is equipped in the analog FE1 in place of the capacitor 15 connected to the external connection terminal 14 shown in FIG. 2. This circuit construction makes the external connection terminal unnecessary, and brings the following effects.

A first effect resides in that it would be unavoidable that any noise is contaminated from the external connection terminal itself if the external connection terminal is led out, however, this embodiment can prevent contamination of such noises.

A second effect resides in that if a capacitance element having a large capacitance value of about 0.1 μF to 10 μF is equipped to the external terminal, the volume of the capacitance element would be large and thus it would be difficult to miniaturize the overall construction of the system, however, this embodiment can miniaturize the system by providing the capacitance element in IC.

The other parts are the same as the embodiment of FIG. 2, and the description thereof is omitted.

Figure 6:
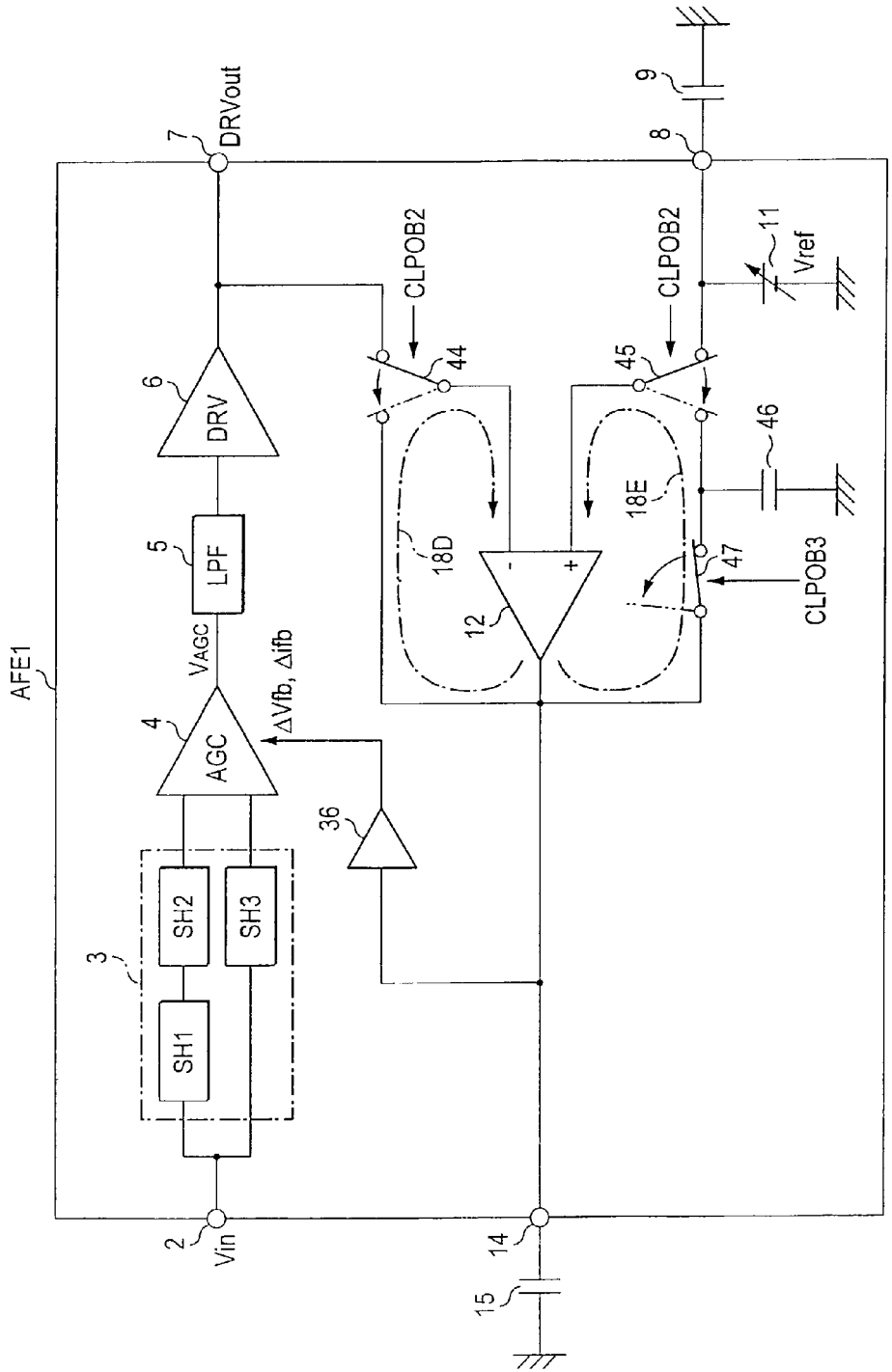
FIG. 6 is a block diagram showing the construction of an analog FE of a solid-state image pickup device according to a fourth embodiment of the present invention.

FIG. 6 is a block diagram showing the construction of an analog FE of a solid-state image pickup device according to a fourth embodiment of the present invention.

In this embodiment, switches 44, 45 for switching the input of the OP amplifier 12, an internal capacitor 46 and a switch 47 for switching the connection of the capacitor 46 are newly equipped in the analog FE1.

That is, in this embodiment, the feedback loop 18A is equipped with two paths 18D, 18E which are directly connected from both the input terminal sides of the OP amplifier 12 to the output terminal side. The internal capacitor 46 and the switch 47 are equipped to the path 18E at the non-inverting input terminal (reference voltage source 11) side.

The switch 44 equipped to the inversion input terminal of the OP amplifier 12 is switched on the basis of the clamp control signal CLPOB 2 to select one of the voltage current conversion circuit 36 side and the output signal DRVout side to which the inverting input terminal of the OP amplifier 12 should be connected through the path 18D.

Further, the switch 45 equipped to the non-inverting input terminal of the OP amplifier 12 is switched on the basis of the clamp control signal CLPOB 2 to select one of the side of the internal capacitor 46 and the switch 47 and the reference voltage source 11 side to which the non-inverting input terminal of the OP amplifier 12 should be connected through the path 18E.

Still further, the switch 47 is switched on the basis of the clamp control signal CLPOB 3 to determine whether the internal capacitor 46 should be connected to the voltage-current converting circuit 36 side or not.

The construction of this embodiment aims at the noise countermeasure 34-2B of FIG. 1. That is, the prior art has the disadvantage that the external capacitor 15 is kept under the floating state and thus contamination of noises is unavoidable. However, this embodiment takes the noise countermeasure so that the external capacitor 15 is prevented from being kept under the floating state.

That is, in the construction of FIG. 6, the switches 44, 45, 47 are kept under a state indicated by a "solid line" during the period for which the feedback operation is set to "ON". That is, the OP amplifier 12 is operated, and the differential output voltage from the OP amplifier 12 is written into the internal capacitor 46.

Further, when the clamp period is finished, the switches 44, 45, 47 are switched to a state indicated by a "broken line". Accordingly, the voltage written in the internal capacitor 46 is also output to the external connection terminal 14 side, so that the external capacitor 15 is not set to the floating state and the effect of the external noises can be eliminated.

As described above, there can be achieved the construction in that the external capacitor 15 is prevented from being set to the floating state even when the switch 44 for clamp is set to "OFF".

In the embodiment of FIG. 6, the external capacitor 15 is illustrated, however, it may be merged with the internal capacitor 46. That is, the external capacitor 15 may be omitted. Likewise, the external capacitor 9 may be formed in the chip, and thus it may be omitted.

Figure 7:
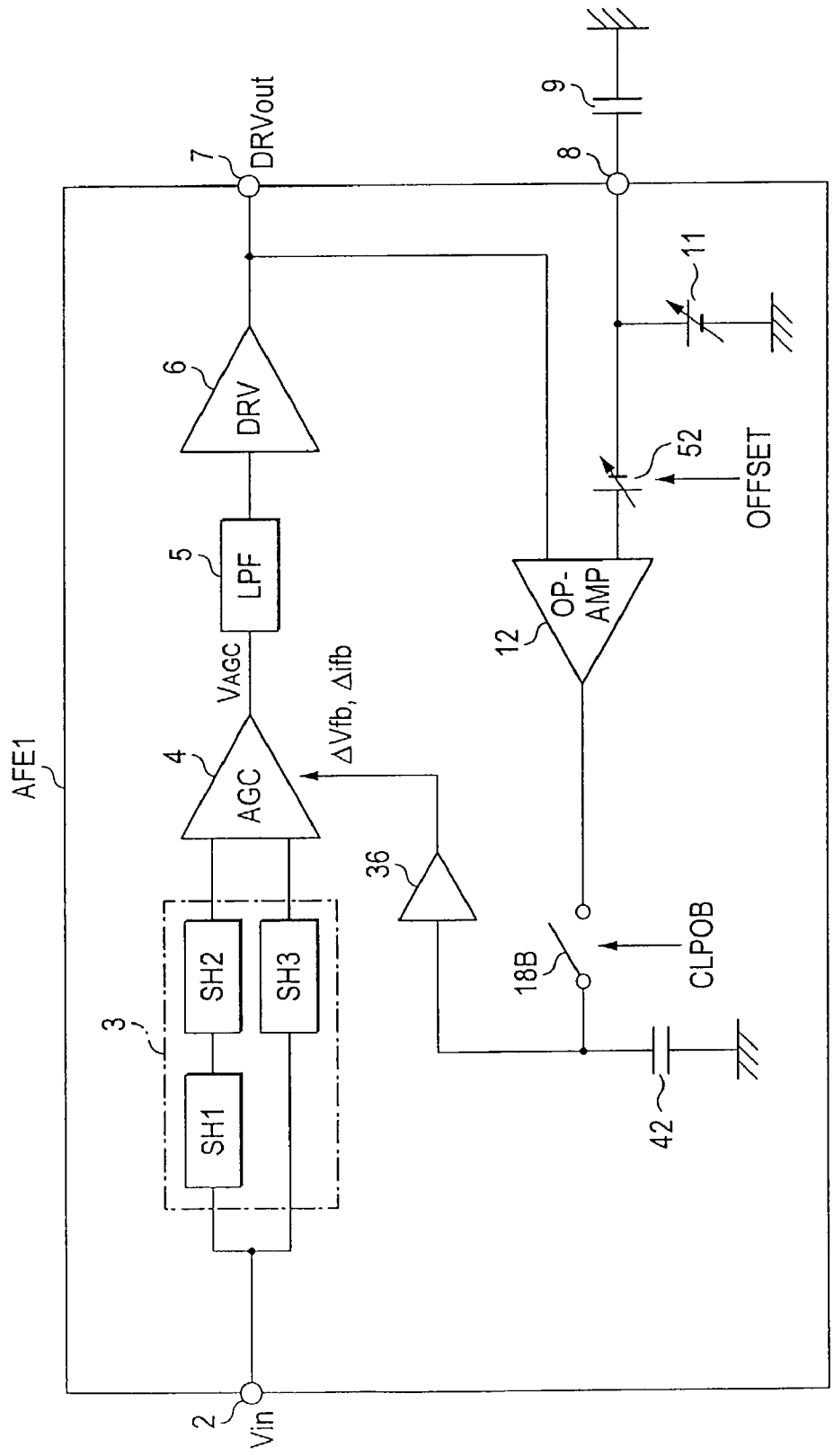
FIG. 7 is a block diagram showing the construction of an analog FE of a solid-state image pickup device according to a fifth embodiment of the present invention.

FIG. 7 is a block diagram showing the construction of an analog FE of a solid-state image pickup device according to a fifth embodiment of the present invention.

The analog FE1 of this embodiment is equipped with a minute voltage varying circuit 52 so as to vary the voltage of the reference voltage Vref 11. The minute voltage varying circuit 52 is variably adjustable to a predetermined value on the basis of an offset signal OFFSET from the external. A minute voltage $\Delta Vref$ is generated by the minute voltage varying circuit 52 so that the output signal DRVout during the feedback clamp period can be made coincident with the voltage of Vref $+\Delta Vref$.

Figure 8:
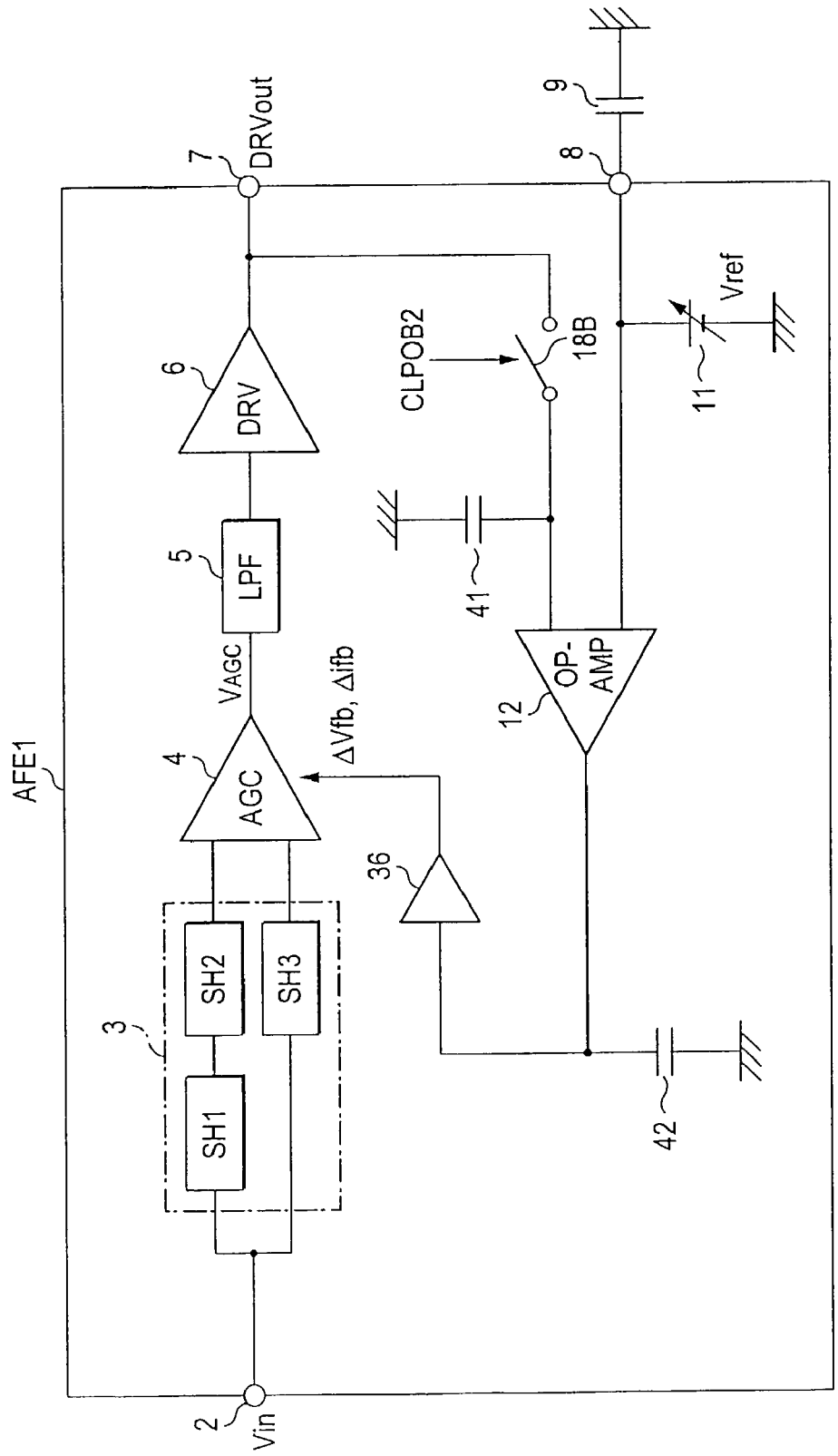
FIG. 8 is a block diagram showing the construction of an analog FE of a solid-state image pickup device according to a sixth embodiment of the present invention.

FIG. 8 is a block diagram showing the construction of an analog FE of a solid-state image pickup device according to a sixth embodiment of the present invention.

This embodiment is a modification of the second embodiment shown in FIG. 4, in which the same internal capacitor 42 as the third embodiment shown in FIG. 5 is equipped in place of the external capacitor 15 connected to the external connection terminal 14. It is assumed that the internal capacitor 42 is formed in a semiconductor substrate. With this circuit construction, the effect of the noises contaminated from the external connection terminal can be suppressed.

Figure 9:
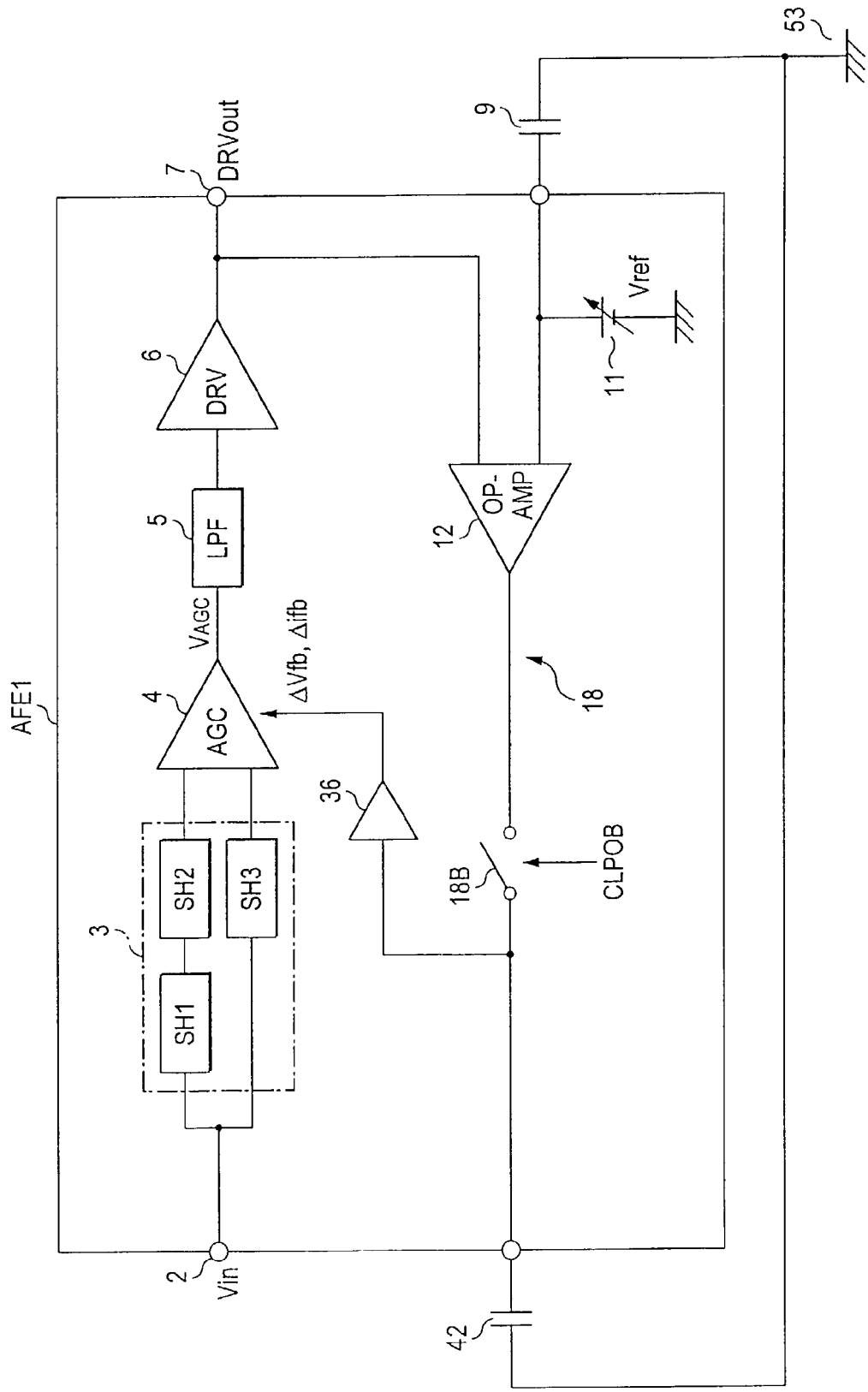
FIG. 9 is a block diagram showing the construction of an analog FE of a solid-state image pickup device according to a seventh embodiment of the present invention.

FIG. 9 is a block diagram showing the construction of an analog FE of a solid-state image pickup device according to a seventh embodiment of the present invention.

In this embodiment, the other electrode of the capacitor 15 connected to the external connection terminal 14 is short-circuited to the other electrode of the capacitor 9 for holding the reference voltage Vref of the OP amplifier 12, and these electrodes are connected to the common GND (or common VDD) 53. This means that by establishing the common GND (common VDD) on the external substrate, the effect of noises contaminated from the external terminal is generated in the two capacitors at the same time to increase the in-phase input noise removal ratio and suppress the effect of the noises.

Figure 10:
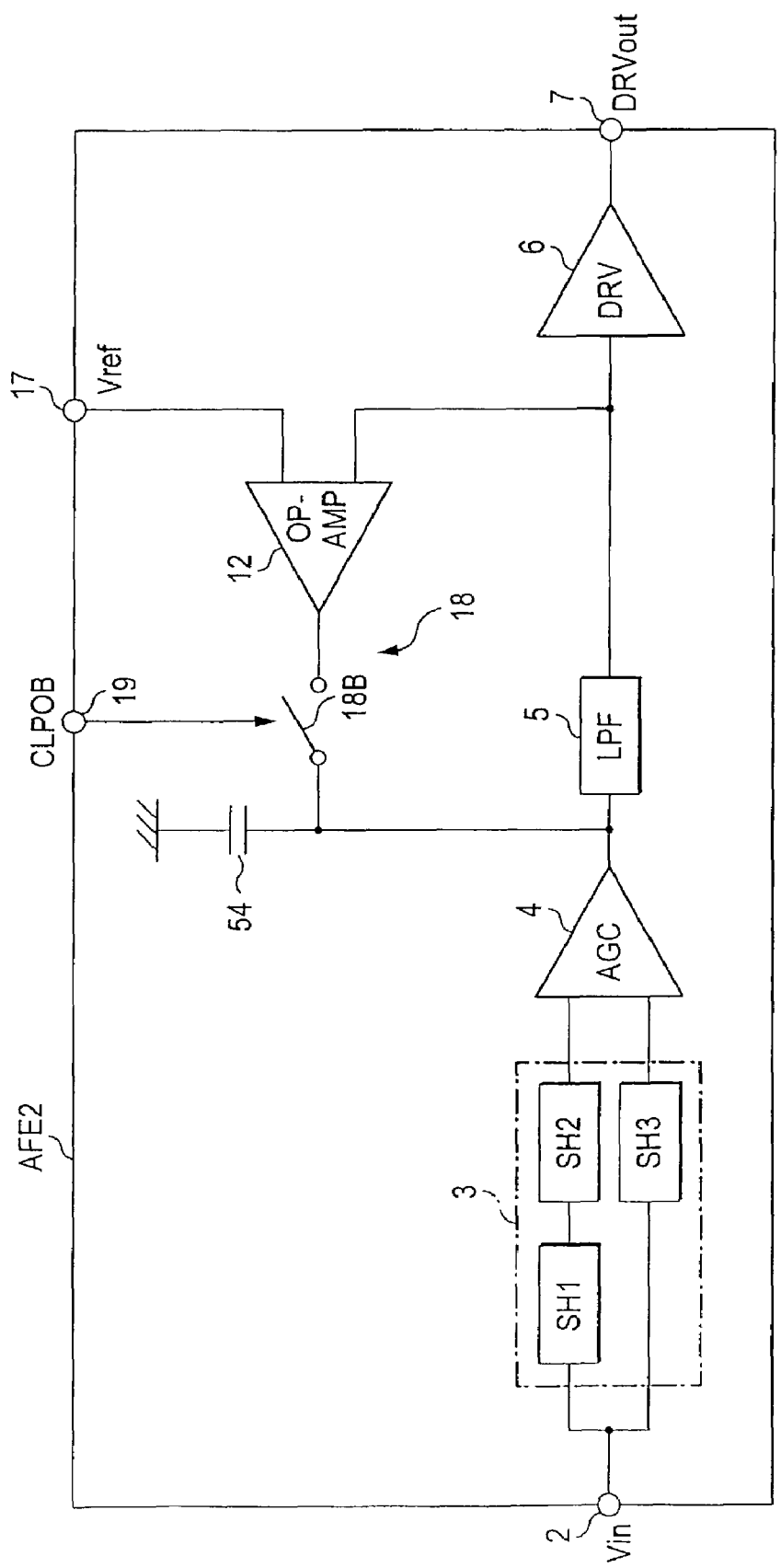
FIG. 10 is a block diagram showing the construction of an analog FE of a solid-state image pickup device according to an eighth embodiment of the present invention.

FIG. 10 is a block diagram showing the construction of an analog FE of a solid-state image pickup device according to an eighth embodiment of the present invention.

Figure 16:
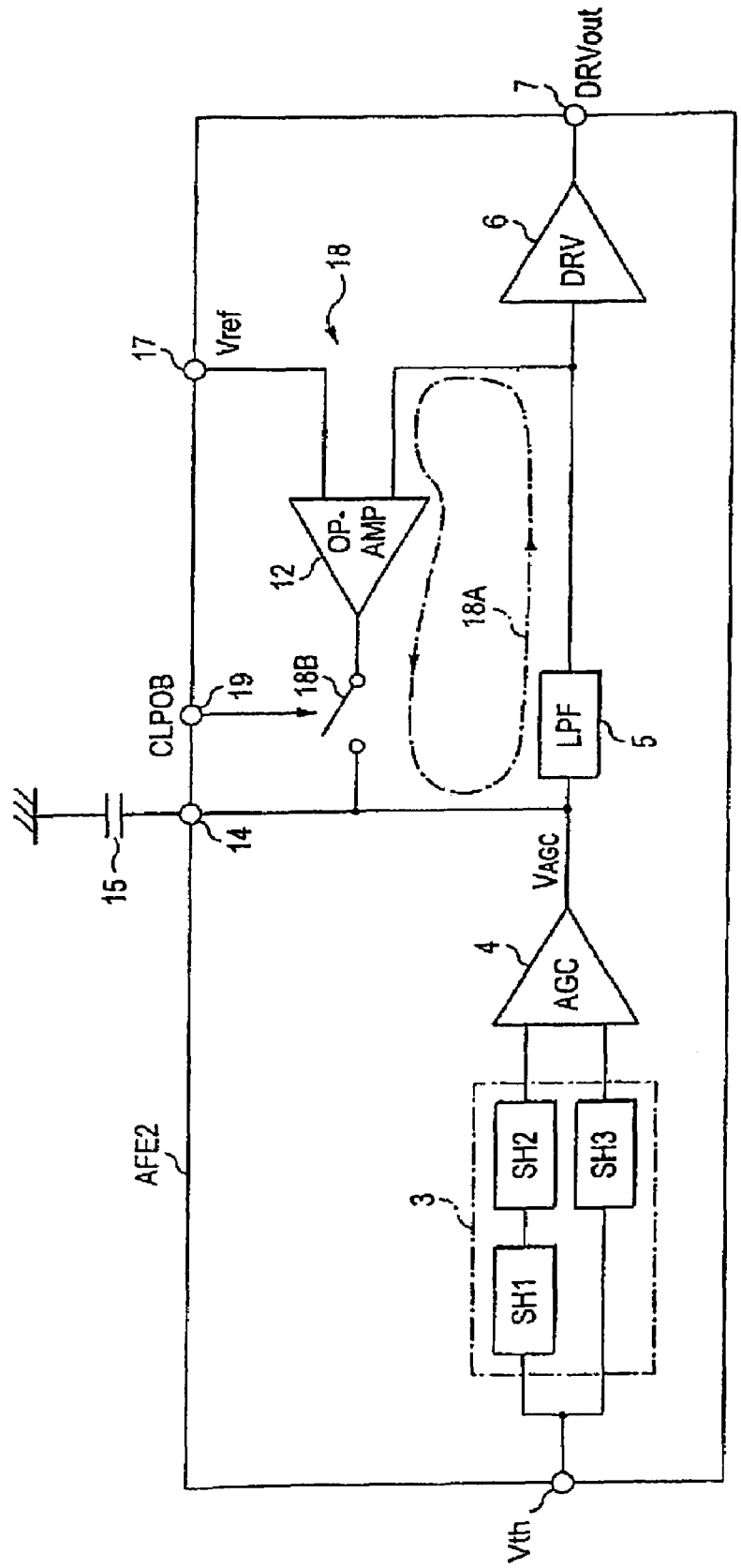
FIG. 16 is a block diagram showing a second construction of the analog FE equipped to the conventional solid-state image pickup device.
Figure 17:
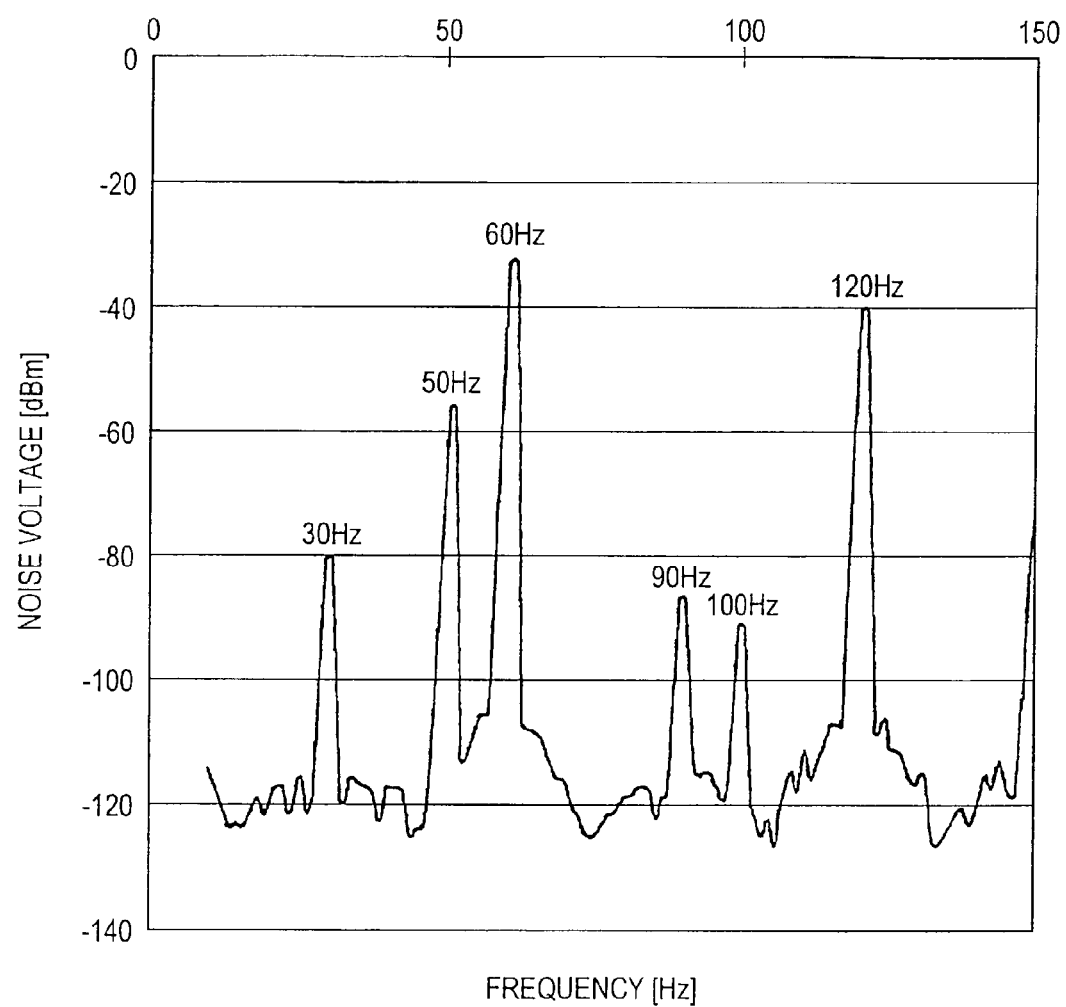
FIG. 17 is a diagram showing a specific example of a noise voltage contaminated in a power source in the conventional solid-state image pickup device.

In this embodiment, the present invention is applied to the analog FE2 having the construction shown in FIG. 16, and an internal capacitor 54 is equipped in the IC chip in place of the external capacitor. Accordingly, the external connection terminal 14 can be eliminated and the effect of noises contaminated from the external connection terminal can be suppressed.

Figure 11:
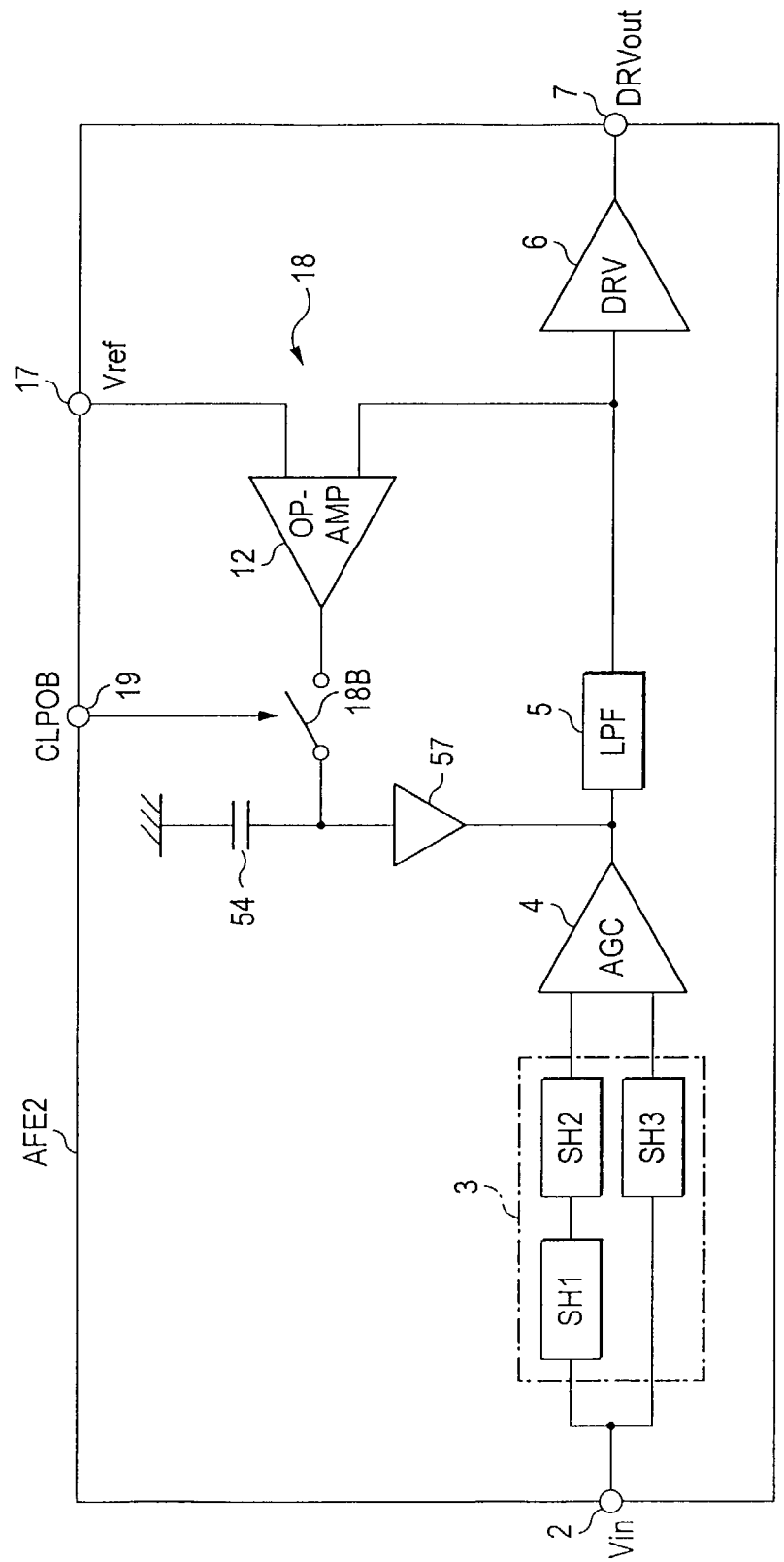
FIG. 11 is a block diagram showing the construction of an analog FE of a solid-state image pickup device according to a ninth embodiment of the present invention.

FIG. 11 is a block diagram showing the construction of an analog FE of a solid-state image pickup device according to a ninth embodiment of the present invention.

According to this embodiment, in the construction shown in FIG. 10, a gain converting circuit 57 serving as the gain control means is further equipped subsequently to the OP amplifier 12 and the switch 18B of the feedback loop 18A. This circuit construction enables the control of the large gain of the OP amplifier 12, and the effect of noises contaminated from the power source and GND for the OP amplifier 12 can be suppressed by setting the feedback loop gain to a predetermined magnitude or less.

Figure 12:
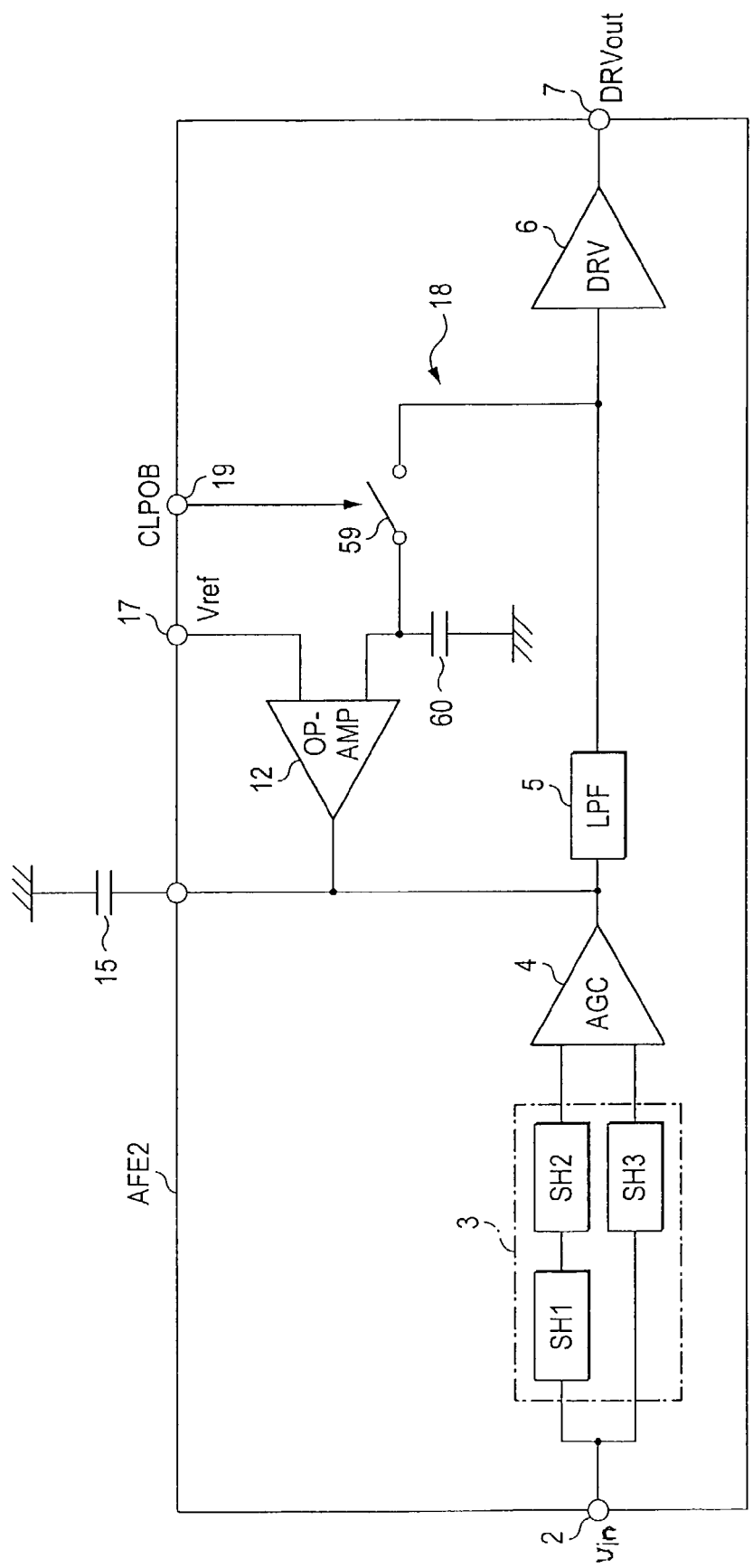
FIG. 12 is a block diagram showing the construction of an analog FE of a solid-state image pickup device according to a tenth embodiment of the present invention.

FIG. 12 is a block diagram showing the construction of an analog FE of a solid-state image pickup device according to a tenth embodiment of the present invention.

According to this embodiment, a switch 59 for clamp and a capacitor 60 are equipped to the input terminal (inverting input terminal) at the feedback loop side of the OP amplifier 12 so that the external capacitor 15 is prevented from being kept under the floating state in the analog FE2 having the construction shown in FIG. 16. That is, in FIG. 12, the switch 59 carries out the opening/closing operation thereof on the basis of the clamp control signal CLPOB to perform the switching operation of the connection/disconnection between the inverting input terminal of the OP amplifier 12 and the feedback loop.

In this construction, the output signal of the low pass filter 5 is written into the internal capacitor 60 in the feedback clamp operation. Accordingly, even when the switch 59 is set to "OFF", the external capacitor 15 is prevented from being kept under the floating state because the previous signal has been written in the internal capacitor 60. Therefore, the effect of noises contaminated from the external terminal can be suppressed.

Figure 13:
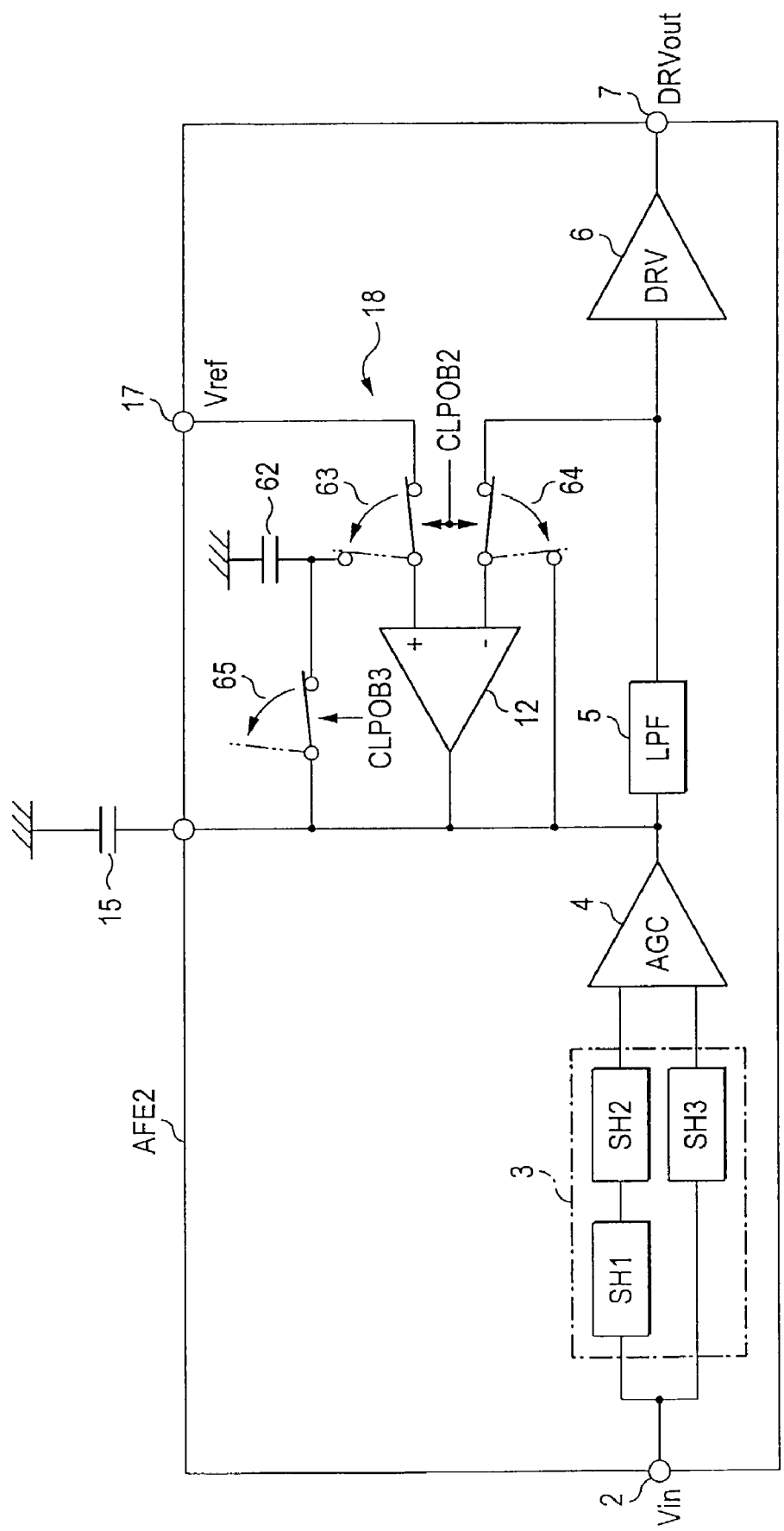
FIG. 13 is a block diagram showing the construction of an analog FE of a solid-state image pickup device according to an eleventh embodiment of the present invention.

FIG. 13 is a block diagram showing the construction of an analog FE of a solid-state image pickup device according to an eleventh embodiment according to the present invention.

In this embodiment, the principle shown in FIG. 6 is applied to the analog FE2 having the construction shown in FIG. 10, and it is equipped with an internal capacitor 62 in which the output voltage of the OP amplifier 12 is written in the feedback clamp operation, and switches 63, 64 and 65 for performing this writing operation.

The switch 63 connects the non-inverting input terminal of the OP amplifier 12 to the internal capacitor 62 or the reference voltage Vref on the basis of the clamp control signal CLPOB2. The switch 64 connects the inverting input terminal of the OP amplifier 12 to the output terminal of the OP amplifier 12 or the output terminal of the LFP circuit 5 on the basis of the clamp control signal CLPOB2.

Further, the switch 65 switches the connection/disconnection between the internal capacitor 62 and the output terminal of the OP amplifier 12 on the basis of the clamp control signal CLPOB3. In this construction, the switches 63, 64, 65 are switched from the state of "solid line" to the state of "dotted line" out of the CLPOB period of FIG. 1 (i.e., during the period 32-2 other than the CLPOB period of FIG. 1), whereby the voltage written in the internal capacitor 62 can be output at all times.

Figure 14:
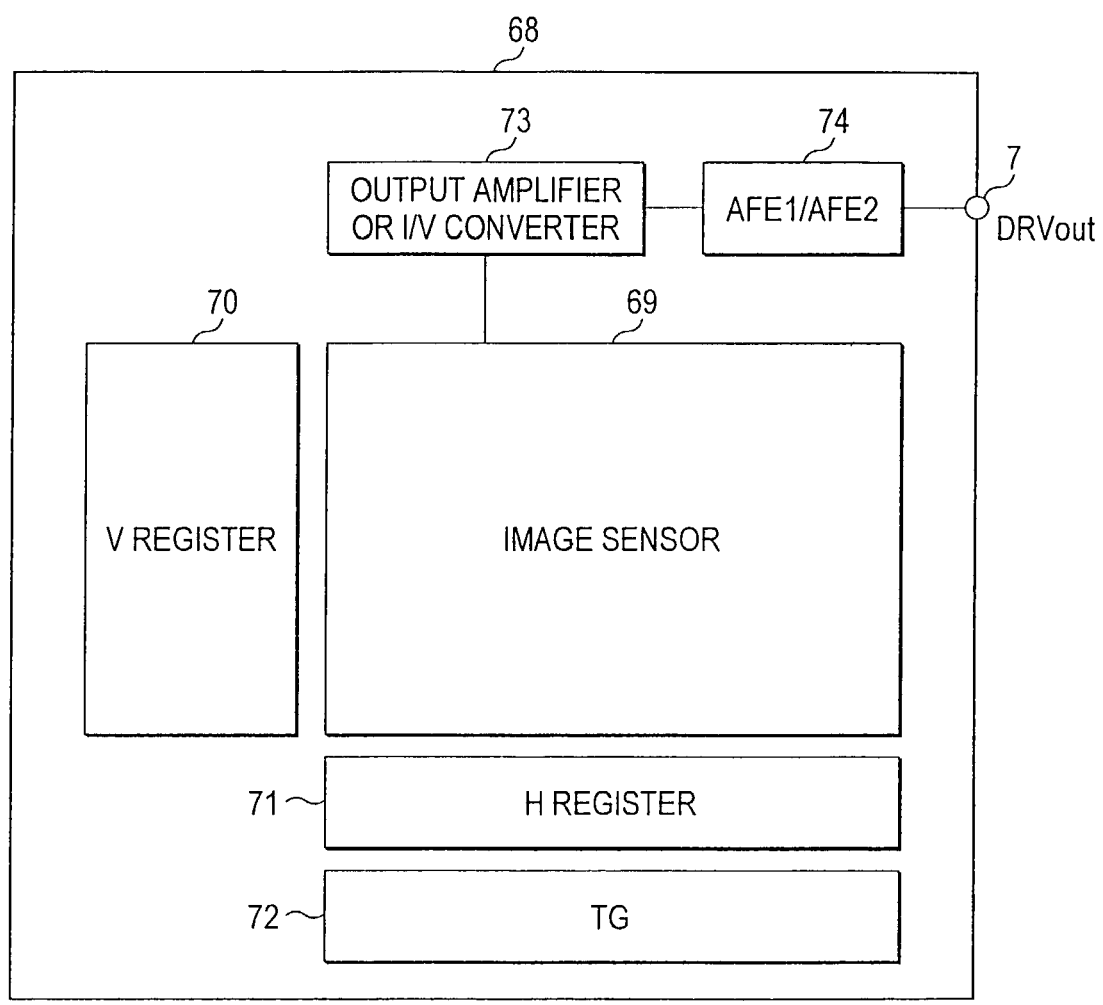
FIG. 14 is a block diagram showing the overall construction of a solid-state image pickup device (CMOS-type image sensor) having the analog FE of each of the embodiments of the present invention.

FIG. 14 is a block diagram showing the overall construction of a solid-state image pickup device (CMOS type image sensor) in which the analog FE (AFE1, AFE2) of each embodiment of the present invention is mounted.

An analog FE 74 in FIG. 14 is a block constructed by any one of the analog FE1 or the analog FE2.

In this solid-state image pickup device, a image sensor area 69, each block of a vertical register 70, a horizontal register 71, an output amplifier 73, a timing generator TG 72 and the analog FE 74 is mounted on a semiconductor substrate 68, and the analog FE 74 is formed on the same chip as the image sensor.

In such a solid-state image pickup device, the black reference signal is provided to at least one of the vertical blanking period and the horizontal blanking period. Since the device temperature is varied at every moment under the actual available condition, the reference voltage of the output signal DRVout of the image sensor 69 can be kept to a fixed value through the clamp operation of the black reference voltage by the feedback loop clamp circuit described above.

Accordingly, the solid-state image pickup device of the present invention can be broadly applied to a CMOS type image sensor as shown in FIG. 14. Further, in a CCD image sensor or the like, the analog FE of each embodiment may be equipped as a separately-designed chip.

That is, the present invention can be broadly applied to a CCD image sensor, a CMOS image sensor, etc.

According to the solid-state image pickup device and the clamp control method of the above-described embodiments of the present invention, the following effects can be achieved.

1. In order to reduce the gain of the feedback loop, the effect of noises contaminated from the inside and outside of the chip can be suppressed.

2. The floating state of the external terminal into which various kinds of noises are liable to be contaminated is prevented, so that the effect of hum noises, etc. can be suppressed.

3. Since an external capacitance element can be formed in the chip, the system using the IC can be miniaturized.

As described above, according to the solid-state image pickup device and the clamp control method of the present invention, the clamp circuit for making the output value of the gain control amplifier corresponding to the period of the black reference signal coincident with the predetermined reference value is equipped with the gain control means for controlling the gain of the clamp signal supplied to the gain control amplifier. Therefore, even when various kinds of noises are contaminated from the power source for the clamp circuit, external circuits, etc., these noises can be suppressed by the gain control means and the effect of the noises on the gain control amplifier can be reduced, so that the effect of noises on image pickup signals can be suppressed.

Further, according to the solid-state image pickup device of the present invention, the node connected to the first capacitance element for suppressing the voltage variation out of the feedback clamp period is prevented from being kept under the floating state out of the clamp period, so that the state of the clamp circuit can be stabilized in the period other than the clamp period, and the effect of hum noises, etc. can be suppressed.

What is claimed is:

1. A solid-state image pickup device comprising:
   an image sensor outputting a black reference signal during at least one of a vertical blanking period and a horizontal blanking period;
   a correlated double sampling circuit for removing noises from an output signal from the image sensor and outputting a correlated output signal;
   a gain control amplifier for amplifying the correlated output signal of the correlated double sampling circuit and outputting a gain adjusted output signal; and
   a clamp circuit for making the output value of the gain control amplifier corresponding to the period of the black reference signal coincident with a predetermined reference value by controlling the gain control amplifier to vary the gain applied to the correlated output signal of the correlated double sampling circuit relative to a clamp signal provided to the gain control amplifier, wherein said clamp circuit comprises:
      a feedback loop for performing feedback control on said gain control amplifier on the basis of the gain adjusted output signal;
      operating means for comparing the gain adjusted output signal with a reference value and outputting a clamp signal;
      a switch for opening/closing said feedback loop in accordance with the period of the black reference signal; and
      gain control means for controlling the gain of the clamp signal supplied to said gain control amplifier.

2. The solid-state image pickup device as claimed in claim 1, wherein said correlated double sampling circuit, said gain control amplifier and at least said feedback loop, said switch and said gain control means of said clamp circuit are equipped in the same IC.

3. The solid-state image pickup device as claimed in claim 1, wherein said gain control means comprises any one of a current-voltage converting circuit, a voltage-current converting circuit, a current-current converting circuit and a voltage-voltage converting circuit.

4. The solid-state image pickup device as claimed in claim 1, wherein said gain control means supplies said gain control amplifier with a voltage value $\Delta Vfb$ ($\Delta Vfb < \Delta Vout$) smaller than the voltage variation value $\Delta Vout$ of the clamp signal based on said feedback loop.

5. The solid-state image pickup device as claimed in claim 1, wherein the feedback loop provides an analog feedback signal to the gain control amplifier that is altered by the gain control means.

6. The solid-state image pickup device as claimed in claim 1, wherein the switch for opening/closing said feedback loop has one node connected to a first capacitance element that is equipped externally to the IC in which said clamp circuit is equipped.

7. A solid-state image pickup device comprising:
   an image sensor outputting a black reference signal during at least one of a vertical blanking period and a horizontal blanking period;
   a correlated double sampling circuit for removing noises from an output signal from the image sensor and outputting a correlated output signal;
   a gain control amplifier for amplifying the correlated output signal of the correlated double sampling circuit and outputting a gain adjusted output signal; and
   a clamp circuit for making the output value of the gain control amplifier corresponding to the period of the blank reference signal coincident with a predetermined reference value by controlling the gain control amplifier to vary the gain applied to the correlated output signal of the correlated double sampling circuit relative to a clamp signal provided to the gain control amplifier, wherein said clamp circuit comprises:
      a feedback loop for performing feedback control on said gain control amplifier on the basis of the gain adjusted output signal;
      operating means for comparing the gain adjusted output signal with a reference value and outputting a clamp signal;
      a switch for opening/closing said feedback loop in accordance with the period of the black reference signal, said switch having at least one node directly connected to a first capacitance element to suppress voltage variation during a period other than a feedback clamp period so that the node concerned is prevented from being kept under a floating state outside of a clamp period.

8. The solid-state image pickup device as claimed in claim 7, wherein said node is equipped between said switch and said gain control means.

9. The solid-state image pickup device as claimed in claim 7, wherein said first capacitance element is equipped on the same IC as said clamp circuit.

10. The solid-state image pickup device as claimed in claim 7, wherein said first capacitance element is equipped externally to the IC in which said clamp circuit is equipped, and said node is connected to an external terminal to which said first capacitance element is connected.

11. The solid-state image pickup device as claimed in claim 10, wherein a second capacitance element is directly connected to an input terminal of said operating means from which the output signal of said operating means is fed back.

12. The solid-state image pickup device as claimed in claim 7, wherein the feedback loop provides an analog feedback signal to the gain control amplifier that is altered by the gain control means.

13. A clamp control method for a solid-state image pickup device comprising:
   an image sensor outputting a black reference signal during at least one of a vertical blanking period and a horizontal blanking period,
   a correlated double sampling circuit for removing noises from an output signal from the image sensor and outputting a correlated output signal,
   a gain control amplifier for amplifying the correlated output signal of the correlated double sampling circuit and outputting a gain adjusted output signal, and
   a clamp circuit for making the output value of the gain control amplifier corresponding to the period of the blank reference signal coincident with a predetermined reference value by controlling the gain control amplifier to vary the gain applied to the correlated output signal of the correlated double sampling circuit relative to a clamp signal provided to the gain control amplifier, the clamp circuit comprising:

a feedback loop for performing feedback control on the gain control amplifier ante basis of the gain adjusted output signal, operating means for comparing the gain adjusted output signal with the reference value and outputting a clamp signal, a switch for opening/closing the feedback loop in accordance with the period of the black reference signal, and gain control means for controlling the gain of the clamp signal supplied to the gain control amplifier, wherein the gain of the clamp signal supplied to the gain control amplifier is controlled by another gain control means different from the operating means.

14. The clamp control method as claimed in claim 13, wherein the gain control amplifier is supplied with a voltage value $\Delta Vfb$ ($\Delta Vfb < \Delta Vout$) smaller than the voltage variation value Vout of the clamp signal based on the feedback loop to control the gain.

15. The clamp control method as claimed in claim 13, wherein the feedback loop provides an analog feedback signal to the gain control amplifier that is altered by the gain control means.

16. The solid-state image pickup device as claimed in claim 13, wherein the switch for opening/closing said feedback loop has one node connected to a first capacitance element that is equipped externally to the IC in which said clamp circuit is equipped.

\* \* \* \* \*